United States Patent
Lloyd

[15] 3,657,629
[45] Apr. 18, 1972

[54] NAVIGATIONAL INSTRUMENT

[72] Inventor: Edward C. Lloyd, 8624 Red Coat Lane, Potomac, Md. 20854

[22] Filed: Feb. 26, 1970

[21] Appl. No.: 14,367

[52] U.S. Cl..................................318/647, 318/653, 33/222
[51] Int. Cl..........................................................G05f 1/00
[58] Field of Search..................318/653, 647, 587, 588, 580; 324/045; 33/222, 204 L

[56] References Cited

UNITED STATES PATENTS

| | | | |
|---|---|---|---|
| 3,517,285 | 6/1970 | Kundler | 318/588 |
| 2,924,886 | 2/1960 | Cullen | 33/222 |
| 2,403,091 | 7/1946 | Lear | 318/647 X |
| 3,551,706 | 12/1970 | Chapman | 324/045 X |
| 3,197,880 | 8/1965 | Rice et al. | 324/045 X |
| 3,425,648 | 2/1969 | Wipff et al. | 324/045 X |

*Primary Examiner*—Benjamin Dobeck

[57] ABSTRACT

A Hall-effect transducer mounted on the axis of rotation of the magnet of a shipboard or aircraft magnetic compass produces a time-varying electrical signal having magnitude proportional to the sine of the angle between a preselected heading of the craft and the actual heading at any moment. The signal, and its time-integral which is proportional to the off-course distance of the craft at constant speed, are displayed on indicating meters for the use of the pilot in steering or are applied to control an automatic steering system.

3 Claims, 2 Drawing Figures

PATENTED APR 18 1972 3,657,629

INVENTOR
Edward C. Lloyd

NAVIGATIONAL INSTRUMENT

BACKGROUND OF THE INVENTION.

The invention relates to a navigational instrument, for shipboard or aircraft use, having electrical output voltages of magnitude and direction corresponding to the heading error and to the cumulative net lateral deviation of the craft from a preselected course, such output voltages being applied to provide a display for use of a pilot in steering or to control an automatic steering system. In particular, the invention relates to an instrument of this type that depends for its action upon an electrical signal derived from the action of a magnetic compass element upon a Hall-effect transducer so placed and oriented that this signal is directly proportional to the sine of the angle of deviation of the craft heading from a preselected heading, and in which such signal is integrated with respect to time. Assuming constant speed, the lateral distance error of the craft from its intended course at any time is proportional to $$\int_0^t \sin Z \, dt,$$

where $Z$ is the instantaneous value of the angle between the preselected heading and the actual heading, and $t$ is the elapsed time from the start of the run.

In the normal process of steering an aircraft or watercraft along a preselected course, either manually or automatically, deviations of the heading from the preselected course inevitably occur due to action of the elements on the craft, the necessity for steering around obstacles, and the like. In the use of the usual indications or signals from a conventional compass such deviations may be corrected to the extent of returning the craft to the initial heading, but it is not practicable to determine from the compass the lateral distance that the craft has been displaced from the original course-line. Thus the craft will, in general, be steered on a succession of courses parallel to the original course-line. The corresponding lateral displacements will often accumulate predominately in one direction, thereby causing substantial departure of the craft from the intended line of travel.

The display of off-course distance information in combination with the display of off-course angle information enhances the utility of both types of information by facilitating their rapid assimilation by the pilot without the necessity for his reading and interpreting a compass card. Alternatively, the control of an automatic steering system by a signal derived from the combination of these two quantities permits the system to be operated so as to return the craft to a preselected course-line as well as to a preselected heading, rather than only to a preselected heading as heretofore.

The state of the prior art is illustrated by the following examples. In one method a "transmitting compass" is utilized in which the compass magnet moves between "follow-up" electrical contacts to provide a signal that is used to actuate a course recorder ("Magnetic Compasses and Magnetometers" by Alfred Hine, U. Toronto Press (1968) p. 174). In another method a pair of magnetometers, sensing a component of the earth's magnetic field, are used to control the frequency of variable-frequency electrical signals that actuate counters to indicate the cumulative off-course heading. These methods require relatively elaborate and expensive equipment. The first method suffers further from the lack of means for providing a direct indication of off-course distance. The present invention overcomes the deficiencies of methods similar to that of the first example by deriving a signal from the magnetic field normally present in a magnetic compass without necessity for the compass magnet to actuate electric contacts, capacitance or optical sensing systems or the like. The signal so derived, proportional to the sine of the heading error angle rather than to the angle itself as in older methods, is then well adapted to direct and simple signal processing, display, and control methods. In schemes using magnetometers, as in the second example, serious errors may arise due to changes in the magnitude of the magnetic field component sensed, caused by magnetometer leveling errors or by local magnetic disturbances, that are not related to changes in the relative direction of the horizontal component of the earth's magnetic field. This deficiency is overcome in the present invention by sensing only the angular position of a compass magnet which, in turn, is responsive only to the direction of the local magnetic field and is not affected by changes in its magnitude.

DESCRIPTION OF THE PREFERRED EMBODIMENTS.

An essential component of the invention is a Hall-effect transducer consisting of a thin slab or wafer, usually rectangular in shape, of a semiconducting material such as germanium, indium arsenide, or indium antimonide, having a pair of electrical conductors attached to each pair of opposite edges. The plane through the center of the thin slab or wafer, parallel to the largest face, is herein referred to as the principal plane of the transducer. When an excitation voltage is applied to one pair of conductors the resulting current flowing across the wafer is laterally deflected by any magnetic field component present that is normal to the principal plane and that passes through the wafer. A resulting signal voltage, called the Hall-effect voltage, is generated at the other pair of conductors and is proportional to the excitation current and to the magnitude of such normal magnetic field component.

Figure 1:
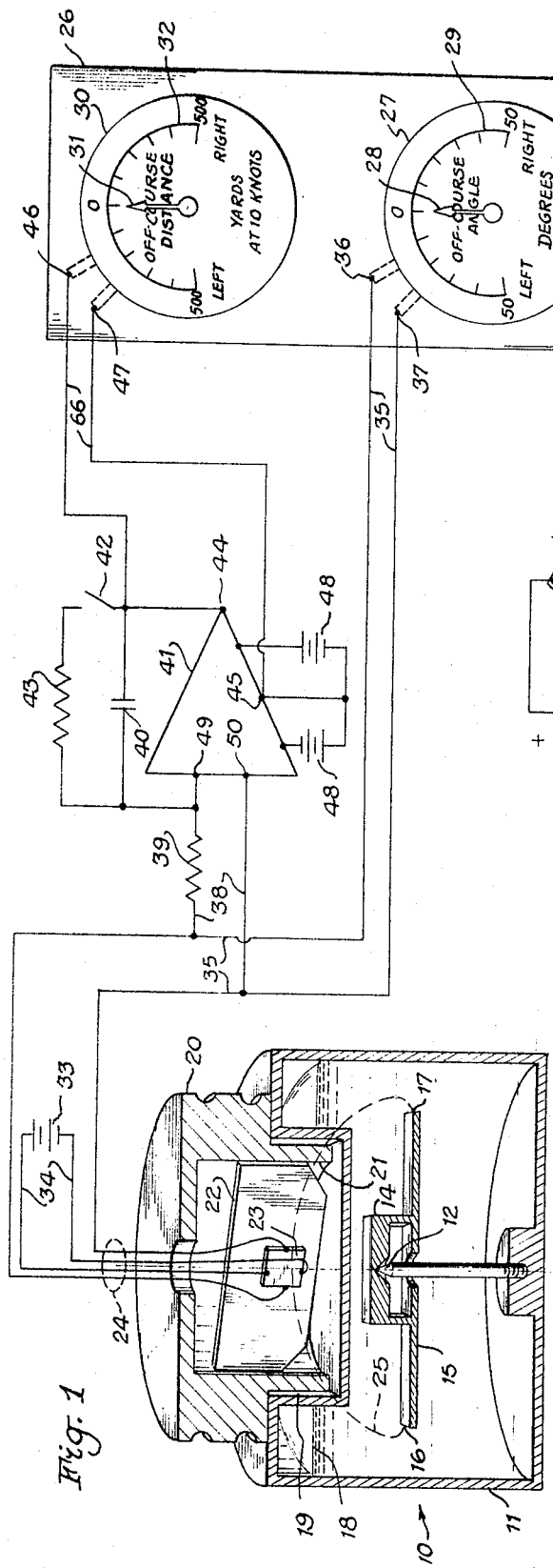
FIG. 1 is a representation of one embodiment of the invention wherein the magnetic compass element and its associated Hall-effect transducer are shown in sectional view, wherein the final signal output is presented as a visual display utilizing two indicating meters shown in full front view, and wherein electrical circuits interconnecting the Hall-effect transducer and the indicating meters are shown in schematic view.

FIG. 1 shows a conventional magnetic compass assembly 10 that is mounted in an aircraft or watercraft. The assembly 10 includes cylindrical compass bowl 11, a fixed pivot 12 mounted centrally within the bowl on vertical axis 13, and a pivot cup 14 adapted to support compass magnet 15 on pivot 12. Magnet 15, having north-seeking and south-seeking poles 16 and 17, is supported in a stable horizontal position so that the axis of the magnet maintains alignment with the horizontal component of the earth's magnetic field. Bowl 11 is partly filled with a liquid 18 that damps the movement of the compass magnet and partially supports it by buoyant effect. Centered in the upper surface of bowl 11 is a cylindrical cavity 19 containing a closely fitting hollow plug consisting of knob 20 and hollow stud shaft 21. Inside the plug is a vertical diametral web 22 on which is mounted, in a centered position on vertical axis 13, a Hall-effect transducer 23 with its principal plane parallel to the plane of web 22. Flexible wires 24 provide electrical connections to the four edges of the Hall-effect transducer, as described above. Stub shaft 21 is manually rotatable within cavity 19 by means of knob 20 so that the principal plane of the Hall-effect transducer may be set at any selected angle about axis 13. Lines of magnetic flux extend between the north-seeking and south-seeking poles 16 and 17, and one such line is illustrated by dashed line 25 passing through Hall-effect transducer 23. The total magnetic flux passing through the Hall-effect transducer is a maximum when its principal plane is normal to the axis of magnet 15, and a minimum when this plane is aligned with the magnet axis. The magnitude of the Hall-effect voltage will be proportional to the magnitude of the flux so intercepted, and thus will be proportional to the sine of the angle between the magnet axis and the principal plane of the transducer, and the polarity of the voltage will depend upon the direction of angular deviation.

The output display comprises instrument panel 26 on which is mounted a direct current voltmeter 27 having a pointer 28 and a zero-center scale 29 marked in degrees of off-course angle. A similar indicator 30 has a pointer 31 and a zero-center scale 32 marked in yards of off-course distance.

The excitation current for the Hall-effect transducer is supplied by a battery 33 via wires 34. The Hall-effect signal from the Hall-effect transducer is connected by wires 35 to the input terminals 36, 37 of the off-course angle indicator 27. The Hall-effect signal is also connected, via wires 35 and 38, to the input of an integrating circuit comprising a resistor 39, capacitor 40, and electronic amplifier 41. The output terminals 44 and 45 of the integrating circuit are connected to the input terminals 46, 47 of the off-course distance indicator 30. Amplifier 41 is an operational amplifier, powered by batteries 48 connected in the usual manner, and has input terminals 49 and 50 and output terminals 44 and 45. The integrating circuit contains a normally open reset switch 42 which functions, with current-limiting resistor 43, to permit manual setting of the voltage across capacitor 40, and thus the integrator circuit output voltage, to zero.

In the operation of the embodiment of the invention of FIG. 1, the craft is brought to a desired heading, and knob 20 is then manually turned to change the angular orientation of transducer 23 until a position is found in which off-course angle indicator 27 indicates zero, and in which an angular deviation of knob 20 is followed by pointer 28 in the same angular direction. In this position the principal plane of Hall-effect transducer 23 is parallel to the axis of magnet 15 and oriented to produce signals of the proper polarity. Switch 42 is then momentarily closed manually, thereby removing any charge that may have accumulated on integrating capacitor 40 and bringing pointer 31 of off-course distance indicator 30 to zero. Thereafter the craft speed is held constant, and as the craft yaws or the heading is temporarily changed due to need for avoidance of obstructions, etc., both the off-course distance and the heading error are indicated continuously. When the vessel is brought back to the preselected course-line, the off-course distance indication returns to zero, and when both pointers are again on zero the vessel is located on the preselected course-line and has the preselected heading. The off-course distance indicator is calibrated in units of distance at a particular speed, at 10 knots for example, and for higher or lower speeds the distance indicated is taken to be greater or smaller, respectively, in proportion.

It is to be noted that variation in magnitude of the component of the local earth's field sensed due, for example, tilting of the compass or to the proximity of iron masses, has no significant effect on the operation of the instrument, since the Hall-effect transducer responds to the constant and relatively large field of the compass magnet rather than to the earth's field directly. The compass magnet, of which the angular alignment is unaffected by changes in magnitude of the earth's field component sensed, produces a field intensity at the Hall-effect transducer at least two orders of magnitude larger than the total earth's field, and at least three orders of magnitude larger than apparent changes in the magnitude of the earth's field encountered in practice. Errors due to such apparent changes are correspondingly small.

Figure 2:
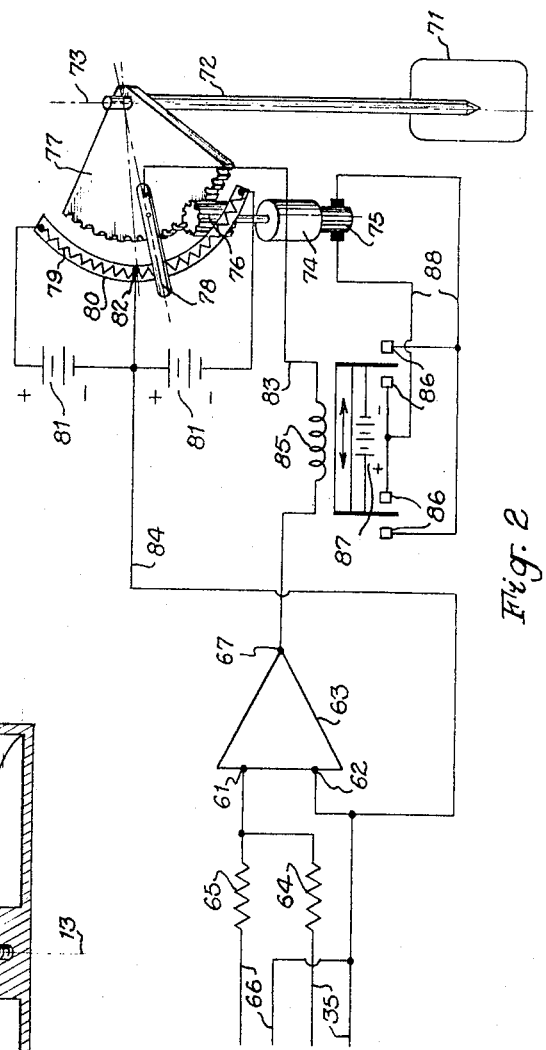
FIG. 2 is a partial diagrammatic representation of another embodiment of the invention, in which an automatic steering system is controlled by signals derived from the Hall-effect transducer.

FIG. 2 shows another embodiment of the invention, in which the Hall-effect voltage on wires 35 of FIG. 1 and the time-integrated Hall-effect voltage on wires 66 of FIG. 1 are algebraically added and used to servocontrol the heading of the craft. In FIG. 2, 63 is an operational amplifier of the same type as amplifier 41 of FIG. 1, and is similarly powered by batteries, not shown. Wires 35 connect the signal output from the Hall-effect transducer of FIG. 1 to amplifier input terminal 61 via resistor 64 and to common terminal 62. Similarly, wires 66 connect the integrated Hall-effect transducer signal from terminals 44 and 45 of amplifier 41 of FIG. 1 to the input terminal 61 via resistor 65 and to common terminal 62. This circuit comprises an adding circuit, whereby the voltage between amplifier output terminal 67 and common terminal 62 is proportional at all times to the algebraic sum of the two input voltages. An aerodynamic or hydrodynamic steering surface 71, mounted on shaft 72 which is free to rotate about axis 73, is angularly positioned about axis 73 by a direct current motor 74 acting through pinion 76 to position gear sector 77 and its rigidly attached shaft 72. In practice, pinion 76 would be positioned to contact gear sector 77 opposite terminal 82, but is shown angularly displaced around axis 73 for clarity. An arm 78 is rigidly attached to gear sector 77 and makes wiping electrical contact with an electrical resistance wire 79 positioned along the length of a fixed sector 80 that is concentric with gear sector 77. Batteries 81 are connected to the center and ends of resistance wire 79 so that the voltage existing at any time between wiper arm 78 and the center terminal 82 will hive a magnitude dependent upon the angular position of gear sector 77 and wiper arm 78, and a polarity dependent upon which side of the center terminal 82 arm 78 rests. This voltage is connected by wires 83 and 84 to the coil of a relay 85 in series with the output signal of amplifier 63, so that the voltage is opposed by the amplifier output voltage. Relay 85 is a three-position double-pole relay that maintains a mid-position when the voltage applied to its coil is small compared to the voltage of batteries 81. When a larger voltage is applied to the coil of relay 85 it closes one of two pairs of contacts 86 connected so that the resultant direction of rotation of motor 74, driven by current from battery 87 via two of the relay contacts 86, wires 88 and commutator 75, is such as to turn gear sector 77 and wiper arm 78 in a direction to reduce the voltage applied to the relay coil. The automatic steering system will thus steer the craft in a direction to minimize the output voltage of amplifier 63 which, in turn, requires that both the Hall-effect voltage and the integrated value of the Hall-effect voltage approach zero. The resultant off-course distance of the craft is thus made to approach zero.

In using the embodiment of the invention of FIG. 2, the craft is brought to the desired heading by manipulating knob 20 with switch 42 held closed, thus causing the automatic steering system to vary the heading of the craft until the principal plane of the Hall-effect transducer 23 is parallel to the axis of compass magnet 15. Switch 42 is then opened, the speed of the craft is thereafter held substantially constant, and the automatic steering system maintains the heading so as to minimize the lateral distance error.

It will be understood, of course, that the fore-going disclosure relates to preferred embodiments of the invention, and that numerous modifications may be made therein without departing from the scope of the invention as set forth in the appended claims. For example, for certain applications the Hall-effect transducer may be excited by alternating current, and the resultant Hall-effect alternating current signal processed by well-known amplifying and rectifying techniques to obtain the same results herein described. In another modification, the Hall-effect voltage may be integrated by a motor having a shaft speed proportional to the applied Hall-effect voltage. In still another modification, the Hall-effect voltage may be processed by an electrochemical method in which the amount of a visible product of an electrochemical action is proportional to the integral of the Hall-effect voltage.

I claim:

1. A navigational system for a craft comprising:
 a compass bowl fixedly mounted on said craft;
 a fixed pivot mounted within said bowl on a Vertical axis;
 a compass magnet supported on said pivot;
 a housing rotatably mounted on said compass bowl for manual rotation about said vertical axis;
 a Hall-effect transducer mounted in said housing with its principal plane vertical and in the magnetic field of said compass magnet;
 four flexible electrical conductors extending into said housing and each contacting a respective edge of said transducer;
 an exciting current source connected to two of said conductors contacting opposed edges of said transducer; and the remaining two of said four conductors connected to a first voltmeter with a zero-center scale whereby, when said craft is set on a course and said housing is angularly set so that said first voltmeter indicates zero, deviations of said craft from said course will cause said first voltmeter to indicate the off-course angle of said deviations.

2. A navigational system as set forth in claim 1, wherein said remaining two conductors are also connected to the input of an integrating operational amplifier; and a second voltmeter with a zero-center scale connected to the output of said amplifier whereby, when said craft is set on a course and said amplifier output is electrically discharged so that said second voltmeter indicates zero, deviations of said craft from said course will cause said second voltmeter to indicate off-course distance of said craft at constant speed of said craft.

3. A navigational system as set forth in claim 2, and further including:

an adding operational amplifier having two inputs connected to said first and second voltmeters, respectively; and means connected to the output of said adding operational amplifier for automatically navigating said craft so as to reduce the magnitude of the voltages at both of said voltmeters toward zero.

* * * * *